(12) United States Patent
Hemmes et al.

(10) Patent No.: US 8,802,323 B2
(45) Date of Patent: Aug. 12, 2014

(54) METHOD FOR THE PRODUCTION OF ELECTRICAL ENERGY FROM AMMONIUM

(75) Inventors: Katrien Hemmes, Amersfoort (NL); Lambert Hooiveld, Veendam (NL)

(73) Assignee: HaskoningDHV Nederland B.V., Amersfoort (NL)

( * ) Notice: Subject to any disclaimer, the term of this patent is extended or adjusted under 35 U.S.C. 154(b) by 113 days.

(21) Appl. No.: 13/393,714

(22) PCT Filed: Aug. 27, 2010

(86) PCT No.: PCT/NL2010/050537
§ 371 (c)(1),
(2), (4) Date: Apr. 3, 2012

(87) PCT Pub. No.: WO2011/028104
PCT Pub. Date: Mar. 10, 2011

(65) Prior Publication Data
US 2012/0189923 A1    Jul. 26, 2012

(30) Foreign Application Priority Data
Sep. 2, 2009   (NL) .................................... 2003429

(51) Int. Cl.
*H01M 8/06* (2006.01)
*H01M 8/04* (2006.01)
*H01M 8/12* (2006.01)

(52) U.S. Cl.
USPC ........................ 429/504; 429/410; 429/495

(58) Field of Classification Search
USPC ........................................ 429/504, 495, 410
See application file for complete search history.

(56) References Cited

U.S. PATENT DOCUMENTS

| 8,034,499 | B2 | 10/2011 | Grieve et al. |
| 2003/0219371 | A1 | 11/2003 | Amendola |
| 2007/0207351 | A1 | 9/2007 | Christensen et al. |
| 2008/0248353 | A1 * | 10/2008 | Grieve et al. .................... 429/26 |

FOREIGN PATENT DOCUMENTS

| WO | WO-2005/03544 A2 | 4/2005 |
| WO | WO-2005/077834 A1 | 8/2005 |
| WO | WO-2009/091959 A2 | 7/2009 |

OTHER PUBLICATIONS

Fournier et al. "High performance direct ammonia solid oxide fuel cell", J. of Power Sources 162 (available online Jul. 26, 2006), pp. 198-206.*

Dekker et al, "Highly Efficient Conversion of Ammonia in Electricity by Solid Oxide Fuel Cells," 6th European Solid Oxide Fuel Cell Forum, Jun. 28-Jul. 2, 2004, pp. 1524-1534

* cited by examiner

*Primary Examiner* — Gregg Cantelmo
(74) *Attorney, Agent, or Firm* — Gilberto M. Villacorta; Tianran Yan; Foley & Lardner LLP

(57) ABSTRACT

The invention provides a method for the production of electrical energy from an ammonium ($NH_4^+$) containing aqueous liquid comprising (a) separating at least part of the ammonium as ammonium salt or concentrated ammonium salt comprising solution from the ammonium containing aqueous liquid, (b) decomposing at least part of the ammonium salt or salt solution into an ammonia ($NH_3$) comprising gas and one or more other decomposition products, and (c) feeding at least part of the ammonia comprising gas to an fuel cell.

18 Claims, No Drawings

METHOD FOR THE PRODUCTION OF ELECTRICAL ENERGY FROM AMMONIUM

FIELD OF THE INVENTION

The invention relates to a method for the production of electrical energy from an ammonium containing aqueous liquid as well as to an apparatus for the production of electrical energy from such ammonium containing aqueous liquid. The invention further relates to the use of ammonia to generate electrical energy.

BACKGROUND OF THE INVENTION

Ammonia ($NH_3$) as a fuel for the Solid Oxide Fuel Cell (SOFC) appears to be very attractive. SOFC systems fuelled with ammonia are relative simple compared with carbon containing fuelled systems, since no humidification of the fuel is necessary to prevent carbon deposition. Also, the endothermic $NH_3$ cracking reaction consumes part of the heat produced by the fuel cell, by which less cathode flow is required for cooling of the stack compared with $H_2$ fuelled systems. Therefore the systems for a $NH_3$ fuelled SOFC will have relatively low parasitic power losses and smaller heat exchangers.

U.S. 2008248353 for instance describes an energy conversion system comprising ammonia for fuelling a SOFC stack to generate electricity and a hydrogen-rich tailgas. In the SOFC stack, ammonia is cracked to hydrogen and nitrogen. Ammonia is stored in a metal halide complex and is released therefrom as gaseous ammonia by waste heat from the SOFC. A heat exchanger is positioned across the SOFC cathode such that incoming air is tempered by the cathode exhaust air. In a two-stage energy conversion system, the hydrogen-rich tailgas from the SOFC is supplied as fuel to a secondary energy conversion device which may be, for example, an internal combustion engine or a gas turbine engine which may operate, for example, either a generator for generating additional electricity or a vehicle for motive power, or a second fuel cell stack.

U.S. 2007207351 describes an electric power generating unit comprising (i) an ammonia storage device in the form of a container comprising an ammonia absorbing and releasing salt of the general formula: $Ma(NH_3)_nX_z$, wherein M is one or more cations selected from alkali metals, alkaline earth metals, and transition metals such as Li, K, Mg, Ca, V, Cr, Mn, Fe, Co, Ni, Cu or Zn, X is one or more anions selected from fluoride, chloride, bromide, iodide, nitrate, thiocyanate, sulphate, molybdate, phosphate, and chlorate ions, a is the number of cations per salt molecule, Z is the number of anions per salt molecule, and n is the coordination number of 2 to 12, (ii) means for heating said container and ammonia absorbing and releasing salt for releasing ammonia gas and (iiia) a fuel cell for converting ammonia directly into electric power; or (iiib1) a reactor for dissociating ammonia into hydrogen and nitrogen and (iiib2) a fuel cell for converting hydrogen into electric power is useful for large stationary energy producing facilities, but also for use for is useful for large stationary energy producing facilities, but also for use for small rechargeable and/or replaceable power supply units for micro-fabricated or miniaturized ammonia decomposition reactors for use in mobile units and portable devices may be used for large energy producing facilities, and by use of small rechargeable and/or replaceable ammonia storage decomposition reactors, it is also possible to provide energy for mobile units and portable devices.

U.S. 2003219371 describes a method and apparatus for generating energy from a composition comprising urea and water are described. The method in one embodiment includes: (a) reacting the urea with water to form ammonia; and (b) oxidizing the ammonia formed in step (a) to form water and nitrogen generating energy. The apparatus in one embodiment contains: (a) a first container for providing the composition; (b) a second container for reacting the urea with water to form ammonia, wherein the second container is connected to the first container by means for delivering the composition from the first container to the second container; (c) a third container for providing ammonia, wherein the third container is connected to the second container by means for delivering ammonia from the third container to the second container; and (d) a fourth container for oxidizing ammonia to form water and nitrogen generating energy, wherein the fourth container is connected to the second container by means for delivering ammonia from the second container to the fourth container. The method and apparatus are used to generate energy for use in stationary and mobile applications.

Dekker et al describe in a paper entitled "Highly efficient conversion of ammonia in electricity by solid oxide fuel cells" ($6^{th}$ European Solid Oxide Fuel Cell Forum, 1 Jan. 2005, p 1524-1534) that SOFC systems fuelled with ammonia are relative simple compared with carbon containing fuelled systems, since no humldiflcation of the fuel is necessary to prevent carbon deposition. Also, the endothermic NH cracking reaction consumes part of the heat produced by the fuel cell, by which less cathode flow Is required for cooling of the stack compared with H. fuelled systems. Therefore the system Tor a NH. fuelled SOFC will have relatively law parasitic power losses end smaller heat exchangers.

WO2009091959 describes methods for removal and disposal of ammonia from spent dialysate in a dialysis system. Ammonium ions present in spent dialysate are converted into gaseous ammonia by raising the pH of the spent dialysate solution in a first reactor. Gaseous ammonia diffuses through a semi-permeable hydrophobic membrane at the outlet of the first reactor and into a second reactor via a gas channel. The second reactor converts gaseous ammonia into an ammonium compound for easy disposal.

WO2005035444 describes an electro-catalyst for the oxidation of ammonia in alkaline media; the electrocatalyst being a noble metal co-deposited on a support with one or more other metals that are active to ammonia oxidation. In some embodiments, the support is platinum, gold, tantalum, or iridium. In some embodiments, the support has a layer of Raney metal deposited thereon prior to the deposition of the catalyst. Also described are electrodes having the electrocatalyst deposited thereon, ammonia electrolytic cells, ammonia fuel cells, ammonia sensors, and a method for removing ammonia contaminants from a contaminated effluent.

SUMMARY OF THE INVENTION

The use of ammonia ($NH_3$) may be relative expensive and may, from an environmental and climate change point of view, not always be desired. Whether the use of ammonia is desired may depend upon the source of ammonia. Further, there is a desire to purify gasses or waste water streams from ammonia or ammonium ($NH_4^+$).

Hence, it is an aspect of the invention to provide an alternative method to generate electrical energy using ammonia that preferably stems from a waste source.

In a first aspect, the invention provides a method for the production of electrical energy from an ammonium containing aqueous liquid comprising:

a. separating at least part of the ammonium as ammonium salt or concentrated ammonium salt comprising solution from the ammonium containing aqueous liquid;

b. decomposing at least part of the ammonium salt into an ammonia comprising gas and one or more other decomposition products;

c. feeding at least part of the ammonia comprising gas to a fuel cell.

Such method on the one hand may advantageously purify waste streams and remove ammonium or ammonia from such streams and on the other hand may beneficially use ammonium salts obtained when removing ammonium or ammonia, not as raw material for fertilizers, but as source of electrical energy. Hence, the method of the invention may reduce water pollution, green gas emissions and may generate sustainable energy.

For instance, waste water streams from plants, which streams comprise ammonium, may be subjected to a crystallization of the ammonium and the ammonium salt obtained may be separated from the waste water stream. This salt may be decomposed, whereby at least ammonia is generated, which, after an optional purification, may be fed to the fuel cell. In another embodiment, the method may involve separating at least part of the ammonium as concentrated ammonium salt comprising solution from the ammonium containing aqueous liquid. Such embodiment may involve for instance the concentration or purification of the ammonium containing aqueous liquid into a purified liquid and a concentrated ammonium salt comprising solution. The latter may be subjected to decomposition, which may for instance be a thermal or chemical decomposition. Chemical decomposition can for instance imply adding a base to an ammonium salt and releasing thereby $NH_3$. The concentrated ammonium salt solution preferably comprises at least 5 wt. %, even more especially at least 10 wt. % of the ammonium salt.

Such method may further reduce transport costs and energy, since the ammonium salt, which, depending upon the type of salt may be reused, such as fertilizer, does not need to be transported to the (re)user of the reusable ammonium salt. Now, at or nearby the source of ammonia or ammonium, energy may be generated from the ammonia or ammonium.

In a specific embodiment, the invention provides a method for the production of electrical energy from an ammonium containing aqueous liquid comprising:

a. crystallizing at least part of the available ammonium from the liquid into an ammonium salt and separating at least part of the ammonium as ammonium salt from the liquid;

b. decomposing at least part of the ammonium salt into ammonia and one or more other decomposition products;

c. feeding at least part of the ammonia to a fuel cell.

In yet another embodiment, the basic source is ammonia, and the ammonium containing aqueous liquid is obtainable by providing an ammonia containing fluid, such as air, from for instance an animal accommodation, to a liquid comprising an acid, such as sulphuric acid and/or hydrochloric acid. In yet a further embodiment, the basic source is ammonia, and the ammonium containing aqueous liquid is obtainable by providing ammonia containing off-gas from, such as from industrial emission, to a liquid comprising acid, such as one or more selected from the group consisting of sulphuric acid and hydrochloric acid. In this way, the ammonium containing aqueous liquid may be produced. Further, in this way, ammonia may be used to generate electrical energy.

In a further aspect, the invention provides an apparatus for the production of electrical energy from an ammonium containing aqueous liquid comprising a. a separator unit arranged to separating at least part of the ammonium as ammonium salt or ammonium salt comprising solution from the liquid;

b. a decomposition unit, arranged downstream of the separator unit, and arranged to decomposing at least part of the ammonium salt into ammonia and one or more other decomposition products;

c. and fuel cell, arranged downstream of the decomposition unit, and arranged to be fed with at least part of the ammonia from the decomposition unit.

Such apparatus may especially be used to perform the method of the invention.

Hence, the invention also provides the use of ammonium salt crystallization for harvesting (purified) ammonia from an ammonium containing aqueous liquid and generating from the ammonia electrical energy, especially in a fuel cell, such as an SOFC.

DESCRIPTION OF PREFERRED EMBODIMENTS

Thus, the invention provides in a first aspect a method for the production of electrical energy from an ammonium containing aqueous liquid. An ammonium containing aqueous liquid relates to an aqueous liquid, especially water, wherein ammonium ions are available.

For instance, the ammonium containing aqueous liquid may comprises one or more liquids selected from the group consisting of an effluent of an anaerobic digester, a stripper water from anaerobic sections of biological phosphor-removing waste water treatment plant (wwtp), a concentrate or filtrate stream from a dewatering section of a biological waste water treatment plant (wwtp), a (concentrated) urine containing liquid or filtrate, a liquid stream, such as a condensate, from a digester or stripper unit. Such liquids may all be considered as waste water streams. Hence, in an embodiment, the ammonium containing aqueous liquid is a waste stream.

In a specific embodiment, the ammonium containing aqueous liquid is obtainable by providing ammonia containing fluid, such as air from for instance an animal accommodation, to a liquid comprising sulphuric acid (in general a concentrated sulphuric acid, i.e. an aqueous solution of sulphuric acid). The animal accommodation may for instance be selected from the group consisting of stable, a cowshed, a cow house, a sty, a fold, a stall, a birdhouse, etc. Air in such accommodations may comprise ammonia, due to the presence of one or more animals selected from the group comprising cows, bulls, horses, sheep, goats, poultry, etc. The animal accommodation is especially an agricultural animal accommodation. Providing ammonia containing air from an animal accommodation to a liquid comprising acid, such as one or more selected from the group consisting of sulphuric acid and hydrochloric acid, may lead to a reaction of the sulphuric acid and ammonia to ammonium sulphate. Especially, a scrubber may be used (to induce the contact between ammonia containing fluid and the liquid comprising sulphuric acid). In this way, an ammonium containing aqueous liquid may be provided for the method of the invention.

In a specific embodiment, the invention involves crystallizing at least part of the available ammonium from the liquid into an ammonium salt and separating at least part of the ammonium as ammonium salt from the liquid. Hence, in an embodiment, the invention may involve concentrating and/or crystallizing at least part of the available ammonium from the liquid into an ammonium salt or concentrated ammonium salt solution and separating at least part of the ammonium as ammonium salt or ammonium concentrate from the liquid.

Crystallization or concentration may be performed in a number of ways, of which three or more may optionally also be combined. For instance, crystallization may be achieved by adding phosphate to the ammonium containing aqueous liquid. For instance, ammonium phosphate may be obtained. In yet another embodiment, crystallization may be achieved by adding sulphate, whereby ammonium sulphate may be obtained. In yet another embodiment, crystallization may be achieved by adding phosphate and one or more of an alkaline earth cation to the ammonium containing aqueous liquid, especially magnesium. While yet in another embodiment evaporation is used as driving force for the crystallization or concentration. In a specific embodiment, the method may involve crystallizing at least part of the available ammonium from the liquid into magnesium ammonium phosphate (MAP) or potassium ammonium phosphate (KAP). Alternatively or in addition to the above methods, crystallization may be induced by controlling the pH and temperature of the ammonium containing aqueous liquid. Often, the waste water already comprises anions like phosphates and cations, such as potassium and/or magnesium with which the ammonium under specific conditions can be forced to crystallize.

Crystallization can be performed with reactors known in the art. Especially, the crystallization may be performed in a fluid bed crystallizer such as for instance described in WO2005/077834 or U.S. Pat. No. 4,389,317. Crystallization may also be performed in a slurry crystallizer. For both mentioned crystallizers, the fundamental driving force for the crystallization can be reactive or evaporative.

Such crystallization reactors may also be applied as separator, wherein at least part of the ammonium as ammonium salt is separated from the ammonium containing aqueous liquid. Alternatively or additionally, also a (downstream) separator may be applied to remove at least part of the ammonium salt. In an embodiment, crystallization may be performed in a crystallisation reactor, and separation may be performed in a separator, arranged downstream of the crystallisation reactor. In a specific embodiment, the separator is a three-way solid, solid, liquid separator. Such embodiment may for instance be used when also biomass is present in the ammonium containing aqueous liquid, such as for instance described in US2008/0073265, which is herein incorporated by reference. Hence, the method may also comprise separating at least part of the ammonium as ammonium salt from the ammonium containing aqueous liquid. Note that the term "ammonium salt" may also relate to a combination of two or more salts, such as MAP and KAP together.

Separation of the ammonium salt or concentrated ammonium salt solution from the ammonium containing aqueous liquid may therefore in an embodiment be achieved by crystallisation.

After production of crystalline material or concentrate, the latter preferable containing at least 10 wt. % ammonium salt, i.e. ammonium salt, from the ammonium containing aqueous liquid, the ammonium salt or concentrated ammonium salt solution (concentrate) will be decomposed. Hence, the method further involves decomposing at least part of the ammonium salt into an ammonia comprising gas and one or more other decomposition products. The one or more other decomposition products may for instance be selected from the group consisting of $CO_2$, $SO_2$, $NO_2$, etc., but also salts or salt solutions, such as MgO, $MgHPO_4$, $MgCl_2$, $Na_2SO_4$, NaCl, $Ca_3(PO_4)_2$, $MgSO_4$, $Mg_3(PO_4)_2$, etc. The decomposition may especially be a thermal decomposition, or alternatively a chemical decomposition. The liberation of $NH_3$ from for instance struvite (magnesium ammonium phosphate, MAP, $MgNH_4PO_4$) is known from the art, see for instance M. Iqbal Hossain Bhuiyan et al, Chemosphere 70 (2008) 1347-1356. The term "ammonia comprising gas" refers to a gas that comprises $NH_3$, but that optionally may further comprise other (gaseous) components, such as one or more selected from the group consisting of $N_2$, $H_2$, $CO_2$, $H_2O$, $H_2S$, etc.

Having obtained ammonia by decomposition of the ammonium salt, the method further involves feeding at least part of the ammonia comprising gas to a fuel cell, such as a Solid Oxide Fuel Cell (SOFC). Before feeding to the fuel cell, the ammonia comprising gas may be purified. Hence, in a specific embodiment, the method of the invention further involves, before feeding the ammonia comprising gas to the fuel cell, purification of the ammonia comprising gas, especially by drying the ammonia comprising gas. In another embodiment, the fuel cell further includes an ammonia converter, preferably a cracker. Such converter is arranged upstream from the fuel cell and downstream of the decomposition unit. For instance, in this way a MCFC (Molten Carbonate Fuel Cell) or PAFC (Phosphoric acid fuel cells) may be applied.

In addition to ammonia, the fuel cell may also be able to use other fuels, such as methane or $H_2$. Such gasses may be emitted from the same plant as where the ammonium/ammonia is generated. Hence, in a specific embodiment, the method further involves feeding simultaneously or sequentially ammonia and another fuel, or a mixture of these two, to the fuel cell, wherein the other fuel comprises one or more fuels selected from the group consisting of syngas ($CO+H_2$), hydrogen gas, and methane. In a specific embodiment, ammonia and biogas are fed to the fuel cell. Before the gas (ses) are fed to the fuel cell, the gas(ses) may be treated, such as for instance enrichment and/or drying. In an embodiment, the methane (for instance in the form of biogas) may originate from an anaerobic digester or a biological waste water treatment plant (see also above). In another embodiment, the methane or biogas may originate from a gasification unit for gasifying organic matter, such as organic (kitchen) waste or manure.

In an embodiment, at least part of the one or more other decomposition products may be returned to crystallize at least part of the available ammonium. For example, concentrate streams from the dewatering of digested sludge from biological wastewater treatment plants contain relatively significantly more ammonium than phosphate. To extensively crystallize ammonium form this stream, magnesium phosphates can be used as reagent for the crystallization of magnesium ammonium phosphate. After thermal composition magnesium phosphate remains as one of the decomposition products and can be recovered to be fed to the crystallizer.

According to yet a further aspect, the invention also provides an apparatus for the production of electrical energy from an ammonium containing aqueous liquid comprising a. a separator unit arranged to separating at least part of the ammonium as ammonium salt or ammonium salt comprising solution from the liquid;

b. a decomposition unit, arranged downstream of the separator unit, and arranged to decomposing at least part of the ammonium salt into ammonia and one or more other decomposition products;

c. and fuel cell, arranged downstream of the decomposition unit, and arranged to be fed with at least part of the ammonia from the decomposition unit.

Such apparatus may be relatively simple and small, and may be arranged at a plant that produces the ammonium/ ammonia. Such apparatus may especially be arranged to perform the method of the invention.

In an embodiment, the apparatus may further comprise a crystallization unit, arranged to crystallize at least part from the available ammonium from the liquid into an ammonium salt. As mentioned above, the crystallization unit may be a fluid bed crystallizer or a slurry crystallizer. The decomposition unit may in an embodiment be a thermal decomposition unit. The fuel cell is especially a SOFC fuel cell.

Hence, the invention advantageously provides the use of ammonium salt crystallization for purifying an ammonium containing aqueous liquid and generating electrical energy.

Specific Embodiments

The following embodiments, which are numbered for the sake of understanding, are also included by the invention. The invention further provides in a first (1) embodiment method for the production of electrical energy from an ammonium (NH4+) containing aqueous liquid comprising:

a. separating at least part of the ammonium as ammonium salt or concentrated ammonium salt comprising solution from the ammonium containing aqueous liquid;

b. decomposing at least part of the ammonium salt into an ammonia (NH3) comprising gas and one or more other decomposition products;

c. feeding at least part of the ammonia comprising gas to a fuel cell.

2. The method according to method embodiment 1, wherein the ammonium containing aqueous liquid is a waste stream.

3. The method according to any one of the preceding method embodiments, wherein the ammonium containing aqueous liquid comprises an effluent of an anaerobic digester, a stripper water from anaerobic sections of biological phosphor-removing waste water treatment plant (wwtp), a concentrate or filtrate stream from a dewatering section of a biological waste water treatment plant (wwtp), a (concentrated) urine containing liquid or filtrate, condensate or other liquid waste streams from digesters, or stripper units.

4. The method according to any one of method embodiments 1-3, wherein the ammonium containing aqueous liquid is obtainable by providing ammonia containing air from an animal accommodation to a liquid comprising acid, such as one or more selected from the group consisting of sulphuric acid and hydrochloric acid.

5. The method according to any one of method embodiments 1-3, wherein the ammonium containing aqueous liquid is obtainable by providing ammonia containing off-gas from industrial emission to a liquid comprising acid, such as one or more selected from the group consisting of sulphuric acid and hydrochloric acid 6. The method according to any of method embodiments 1-3, comprising:

a. crystallizing at least part of the available ammonium from the liquid into an ammonium salt and separating at least part of the ammonium as ammonium salt from the liquid;

b. decomposing at least part of the ammonium salt into ammonia and one or more other decomposition products;

c. feeding at least part of the ammonia to a fuel cell.

7. The method according to method embodiment 6, wherein crystallization is achieved by adding phosphate to the ammonium containing aqueous liquid.

8. The method according to any one of method embodiments 6-7, wherein crystallization is achieved by adding phosphate and one or more of an alkaline earth cation to the ammonium containing aqueous liquid, especially magnesium.

9. The method according to any one of method embodiments 6-8, comprising crystallizing at least part of the available ammonium from the liquid into magnesium ammonium phosphate (MAP) or potassium ammonium phosphate (KAP).

10. The method according to any one of method embodiments 6-9, wherein crystallization is induced by controlling the pH and temperature of the ammonium containing aqueous liquid.

11. The method according to any one of method embodiments 6-10, wherein crystallization is performed in a fluid bed crystallizer.

12. The method according to any one of method embodiments 6-11, wherein crystallization is performed in a slurry crystallizer.

13. The method according to any one of method embodiments 6-12, wherein crystallization is performed in a crystallisation reactor, and separation is performed in a separator, arranged downstream of the crystallisation reactor.

14. The method according to method embodiment 13, wherein the separator is a three-way separator.

15. The method according to any one of the preceding method embodiments, wherein the decomposition is a thermal decomposition.

16. The method according to any one of the preceding method embodiments, wherein the decomposition is a chemical decomposition.

17. The method according to any one of the preceding method embodiments, wherein before feeding the ammonia comprising gas to the fuel cell the ammonia comprising gas is purified, especially by drying the ammonia comprising gas.

18. The method according to any one of the preceding method embodiments, wherein at least part of the one or more other decomposition products is returned to crystallize at least part of the available ammonium.

19. The method according to any one of the preceding method embodiments, wherein the fuel cell is an solid oxide fuel cell (SOFC).

20. The method according to any one of the preceding method embodiments, wherein the fuel cell further includes an ammonia converter, preferably a cracker.

21. The method according to any one of the preceding method embodiments, wherein simultaneously or sequentially ammonia and another fuel, or a mixture of these two are fed to the fuel cell, wherein the other fuel comprises one or more fuels selected from the group consisting of syngas, hydrogen and methane.

22. The method according to method embodiment 21, wherein ammonia and biogas are fed to the fuel cell.

23. The method according to any one of method embodiments 21-22, wherein the methane or biogas originates from an anaerobic digester or a biological waste water treatment plant.

24. The method according to any one of method embodiments 21-22, wherein the methane or biogas originates from a gasification unit for gasifying organic matter.

The invention provides in an embodiment 25 an apparatus for the production of electrical energy from an ammonium containing aqueous liquid comprising a. a separator unit arranged to separating at least part of the ammonium as ammonium salt or concentrated ammonium salt comprising solution from the liquid;

b. a decomposition unit, arranged downstream of the separator unit, and arranged to decomposing at least part of the ammonium salt into ammonia and one or more other decomposition products;

c. a fuel cell, arranged downstream of the decomposition unit, and arranged to be fed with at least part of the ammonia from the decomposition unit.

26. The apparatus according to apparatus embodiment 25, further comprising a crystallization unit, arranged to crystallize at least part from the available ammonium from the liquid into an ammonium salt.

27. The apparatus according to apparatus embodiment 26, wherein the crystallization unit is a fluid bed crystallizer or a slurry crystallizer.

28. The apparatus according to any one of apparatus embodiments 25-27, wherein the decomposition unit is a thermal decomposition unit.

29. The apparatus according to any one of apparatus embodiments 27-28, wherein the fuel cell is a SOFC fuel cell.

30. The apparatus according to any one of apparatus embodiments 25-28, wherein the fuel cell further includes an ammonia converter, preferably a cracker.

31. Use of ammonium salt crystallization for harvesting (purified) ammonia from ammonium containing aqueous liquids and generating from the (purified) ammonia electrical energy with a fuel cell.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. The mere fact that certain measures are recited in mutually different dependent claims does not indicate that a combination of these measures cannot be used to advantage.

The invention claimed is:

1. A method for the production of electrical energy from an ammonium ($NH_4^+$) containing aqueous liquid comprising:
   a. separating from the ammonium containing aqueous liquid at least part of the ammonium as (i) ammonium salt or (ii) concentrated ammonium salt comprising solution;
   b. decomposing at least part of the ammonium salt into an ammonia ($NH_3$) comprising gas and one or more other decomposition products;
   c. feeding at least part of the ammonia comprising gas to a solid oxide fuel cell (SOFC).

2. The method according to claim 1, wherein the ammonium containing aqueous liquid is a waste stream.

3. The method according to claim 2, wherein the waste stream comprises an effluent of an anaerobic digester, a stripper water from anaerobic sections of biological phosphor-removing waste water treatment plant (wwtp), a concentrate or filtrate stream from a dewatering section of a biological waste water treatment plant (wwtp), a (concentrated) urine containing liquid or filtrate, condensate or other liquid waste streams from digesters, or stripper units.

4. The method according to claim 1, wherein the ammonium containing aqueous liquid is obtainable by (i) providing ammonia containing air from an animal accommodation to a liquid comprising acid, and/or (ii) providing ammonia containing off-gas from industrial emission to a liquid comprising acid.

5. The method according to claim 1, comprising:
   a. crystallizing at least part of the available ammonium from the liquid into an ammonium salt and separating at least part of the ammonium as ammonium salt from the liquid;
   b. decomposing at least part of the ammonium salt into ammonia and one or more other decomposition products;
   c. feeding at least part of the ammonia to a fuel cell.

6. The method according to claim 5, wherein crystallization is achieved by adding phosphate, optionally with one or more of an alkaline earth cation, to the ammonium containing aqueous liquid.

7. The method according to claim 6, wherein the earth cation is magnesium.

8. The method according to claim 5, wherein the decomposition is a thermal decomposition and/or a chemical decomposition.

9. The method according to claim 5, comprising crystallizing at least part of the available ammonium from the liquid into magnesium ammonium phosphate (MAP) or potassium ammonium phosphate (KAP).

10. The method according to claim 5, wherein crystallization is induced by controlling the pH and temperature of the ammonium containing aqueous liquid.

11. The method according to claim 1, wherein before feeding the ammonia comprising gas to the fuel cell the ammonia comprising gas is purified by drying.

12. The method according to claim 1, wherein at least part of the one or more other decomposition products is returned to crystallize at least part of the available ammonium.

13. The method according to claim 1, wherein simultaneously or sequentially ammonia and another fuel, or a mixture of these two are fed to the fuel cell, wherein the other fuel comprises one or more fuels selected from the group consisting of syngas, hydrogen and methane.

14. The method according to claim 1, wherein ammonia and biogas are fed to the fuel cell.

15. An apparatus for the production of electrical energy from an ammonium containing aqueous liquid comprising:
   a. a separator unit arranged to separate at least part of the ammonium as (i) ammonium salt or (ii) concentrated ammonium salt comprising solution from the ammonium containing aqueous liquid;
   b. a decomposition unit, arranged downstream of the separator unit, and arranged to decompose at least part of the ammonium salt into ammonia and one or more other decomposition products;
   c. a solid oxide fuel cell (SOFC), arranged downstream of the decomposition unit, and arranged to be fed with at least part of the ammonia from the decomposition unit.

16. The apparatus according to claim 15, further comprising a crystallization unit, arranged to crystallize at least part from the available ammonium from the liquid into an ammonium salt.

17. The apparatus according to claim 16, wherein the crystallization unit is a fluid bed crystallizer or a slurry crystallizer.

18. The apparatus according to claim 16, wherein the decomposition unit is a thermal decomposition unit.

* * * * *